(12) United States Patent
Eberlein et al.

(10) Patent No.: US 9,703,554 B2
(45) Date of Patent: Jul. 11, 2017

(54) CUSTOM CODE MIGRATION SUGGESTION SYSTEM BASED ON ACTUAL CHANGE REFERENCES

(71) Applicant: SAP SE, Walldorf (DE)

(72) Inventors: Peter Eberlein, Malsch (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/960,983

(22) Filed: Dec. 7, 2015

(65) Prior Publication Data

US 2017/0161061 A1    Jun. 8, 2017

(51) Int. Cl.
*G06F 9/44*    (2006.01)

(52) U.S. Cl.
CPC .................... *G06F 8/73* (2013.01)

(58) Field of Classification Search
None
See application file for complete search history.

(56) References Cited

U.S. PATENT DOCUMENTS

| | | |
|---|---|---|
| 7,657,575 B2 | 2/2010 | Eberlein et al. |
| 7,720,992 B2 | 5/2010 | Brendle et al. |
| 7,734,648 B2 | 6/2010 | Eberlein |
| 7,739,387 B2 | 6/2010 | Eberlein et al. |
| 7,971,209 B2 | 6/2011 | Eberlein et al. |
| 8,126,919 B2 | 2/2012 | Eberlein |
| 8,225,303 B2 | 7/2012 | Wagner et al. |
| 8,250,135 B2 | 8/2012 | Driesen et al. |
| 8,301,610 B2 | 10/2012 | Driesen et al. |
| 8,375,130 B2 | 2/2013 | Eberlein et al. |
| 8,402,086 B2 | 3/2013 | Driesen et al. |
| 8,407,297 B2 | 3/2013 | Schmidt-Karaca et al. |
| 8,434,060 B2 | 4/2013 | Driesen et al. |
| 8,458,654 B2 * | 6/2013 | Ahadian ............ G06F 8/75 717/109 |
| 8,467,817 B2 | 6/2013 | Said et al. |
| 8,560,876 B2 | 10/2013 | Driesen et al. |
| 8,566,784 B2 | 10/2013 | Driesen et al. |
| 8,572,369 B2 | 10/2013 | Schmidt-Karaca et al. |
| 8,604,973 B2 | 12/2013 | Schmidt-Karaca et al. |
| 8,612,406 B1 | 12/2013 | Said et al. |
| 8,631,406 B2 | 1/2014 | Driesen et al. |
| 8,645,483 B2 | 2/2014 | Odenheimer et al. |

(Continued)

*Primary Examiner* — Qamrun Nahar
(74) *Attorney, Agent, or Firm* — Fish & Richardson P.C.

(57) ABSTRACT

The present disclosure involves systems, software, and computer implemented methods for generating an example database, including sample code, to provide custom code migration suggestion. In one example, a method may include identifying a set of modified objects at a platform system with which code in a first development system is associated, determining at least one development artifact in the code of the first development system dependent upon at least one of the modified objects, monitoring changes to the code of the first development system for changes to development artifacts dependent upon the at least one modified object, and in response to determining that a change to a particular development artifact dependent upon the at least one modified object, automatically storing information associated with the change to the particular development artifact into the example database which stores examples of changes to code associated with the set of modified objects.

20 Claims, 6 Drawing Sheets

(56) References Cited

U.S. PATENT DOCUMENTS

| | | |
|---|---|---|
| 8,706,772 B2 | 4/2014 | Hartig et al. |
| 8,751,573 B2 | 6/2014 | Said et al. |
| 8,805,986 B2 | 8/2014 | Driesen et al. |
| 8,875,122 B2 | 10/2014 | Driesen et al. |
| 8,880,486 B2 | 11/2014 | Driesen et al. |
| 8,924,384 B2 | 12/2014 | Driesen et al. |
| 8,972,934 B2 | 3/2015 | Driesen et al. |
| 9,003,356 B2 | 4/2015 | Driesen et al. |
| 9,009,105 B2 | 4/2015 | Hartig et al. |
| 9,032,406 B2 | 5/2015 | Eberlein |
| 9,069,984 B2 | 6/2015 | Said et al. |
| 9,077,717 B2 | 7/2015 | Said et al. |
| 9,122,669 B2 | 9/2015 | Demant et al. |
| 9,137,130 B2 | 9/2015 | Driesen et al. |
| 9,182,979 B2 | 11/2015 | Odenheimer et al. |
| 9,183,540 B2 | 11/2015 | Eberlein et al. |

* cited by examiner

CUSTOM CODE MIGRATION SUGGESTION SYSTEM BASED ON ACTUAL CHANGE REFERENCES

TECHNICAL FIELD

The present disclosure relates to systems, software, and computer-implemented methods for automatically generating an example database, including sample code, to provide custom code migration suggestion.

BACKGROUND

When a new software product is released to replace an old product (e.g., core objects in a platform code have been changed), customer code running on the old product may be incompatible with the new product. Appropriate change to the customer code (e.g., objects in the customer code dependent on the changed core objects in the platform code) are needed in order to migrate the customer code to the new product.

SUMMARY

The present disclosure involves systems, software, and computer-implemented methods for automatically generating an example database, including sample code, to provide custom code migration suggestion. One example computer-implemented method includes the following: identifying a set of modified objects at a platform system with which code in a first development system is associated, determining at least one development artifact in the code of the first development system dependent upon at least one of the modified objects, monitoring changes to the code of the first development system for changes to development artifacts dependent upon the at least one modified object, and in response to determining that a change to a particular development artifact dependent upon the at least one modified object, automatically storing information associated with the change to the particular development artifact into the example database which stores examples of changes to code associated with the set of modified objects.

While generally described as computer-implemented software embodied on non-transitory, tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
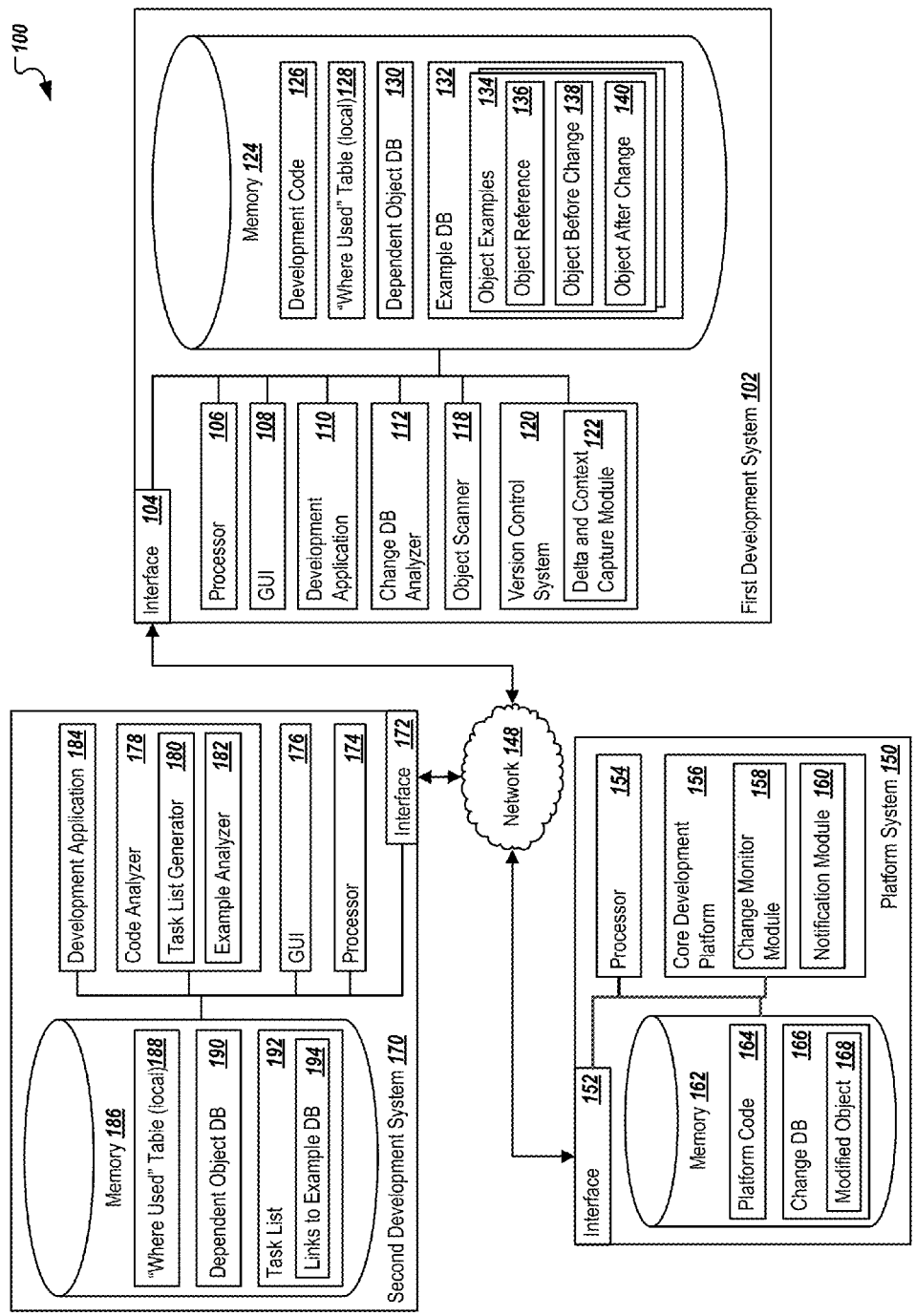
FIG. 1 is a block diagram illustrating an example system for automatically generating an example database, including sample code, to provide custom code migration suggestion.

The present disclosure describes systems and tools for automatically generating an example database, including sample, code to provide custom code migration suggestion. When a new product is released to replace an old product (for example, SAP's S/4 HANA is a successor for SAP's Business Suite R/3), system code or platform code is updated (e.g., a platform change) and persistency is migrated by system tools. However, code developed for system add-ons, partner add-ons, industry solutions, and the customer's own code (e.g., custom code) may have to react to differences between the old and new product due to incompatible core object (e.g., class, report, function, table, view, interface, etc.) changes resulting as a change to the old product into the new. In some instances, the change may be a relatively minor change (e.g., new service pack, updated functionality, etc.) within a particular core or/and platform product, while in other instances the change may be a significant modification of the core and/or platform product, such as a new product. This disclosure describes the process to generate an example database, including sample code, in reaction to a platform change and provide a tool to guide custom code migration.

In some instances, the new product is not a new release of the old product and may not be compatible with the old product. For example, public interfaces of the old product may not exist in the new product; extension interface technology of the old product may be changed in the new product; table of the old produce may be redesigned in the new product; and application program interface (API) of the old product may be changed in the new product. Custom code running on the old product may not run on the new product. Therefore, custom code has to be adjusted and also be persistent in order to migrate the custom code to the new product. In some cases, custom code and persistency adjustments can be performed automatically by tools. However, in most cases, custom code and persistency adjustments are performed manually by a customer developer. This is a major cost contributor for custom code migration projects. Suggestions on how to react to the platform change are desirable as a result and may guide the customer developer to migrate customer code to the new product more easily.

There are several approaches to provide suggestions on how to react to a platform change. Product supplier may prepare a document listing all core object changes and optionally suggestions on how to react to those changes. The document is released with the new product so that the customer developer can refer to the document when migrating custom code to the new product. However, preparing such documents is expensive, time-consuming, and prone to error. In addition, the document may not be helpful to customer developer for dealing with specific problems. Another approach to identify suggestions on how to react to a platform change is by searching a knowledge base. For example, the customer developer may perform a search using a search engine (e.g., Google) and try to find what others did for the same problem. However, searching may not provide good results for specific problems. The customer developer may look through many search results and still not find any useful results.

This disclosure identifies operations for automatically generating an example database, including sample code, written by individuals and entities (e.g., system developer, industry developer, and other trusted developer) as a reaction to a platform change. The core object changes performed in system code or platform code not only require changes in custom code, but also changes in high layer software components (e.g., system add-ons, partner add-ons, customized software based on the platform code, and industry solutions). As a result, there may exist a large set of code adjustments performed in high layer software components as a reaction to the platform change. This solution finds code fragments in higher level components changed as a consequence of a platform change and provides them as examples to other developers. More specifically, this solution analyzes code development in high layer software components automatically and builds an example database with sample code fragments created as a reaction to the platform change, and in response to identifying that code fragments relevant to the change have been modified. These sample code fragments can be accessed via hyperlinks in a task list. The task list is generated for the customer developer and contains objects to be changed in custom code as a reaction to the platform change. Each task in the task list is automatically mapped to entries in the example database based on associations to the same core object change. As a result, code fragments implemented by others reacting to a specific core object change can be provided by the example database to the customer developer as examples to guide the customer developer on how to react to the same specific core object change.

Compared to other approaches described above, this solution automates creation of sample code fragments created by others as a reaction to a platform change. In addition to pointing out objects in custom code that need to be changed as a reaction to the platform change, this solution also provides sample code fragments implemented by others as suggestions to the customer developer dealing with the same platform change. Links can be created for the customer developer to navigate to sample code fragments. Browsing and comparing sample code fragments created by others as a reaction to a specific core object change can be allowed in the customer system. Moreover, this solution allows a feedback-optimization loop that developers can add ratings, hints, and other context information to sample code fragments and optimize the example database over time. Additionally, as not only links to sample code fragments (e.g., copies of code fragments) are provided, but also links to the actual code within the system, users of the system realize at least two additional benefits. First, the user is provided with a full picture of the issue, along navigation to related objects or to review the context in further detail as compared to a small snippet of code. Second, the user can review the change as it was made in their own system, which may be different from the original system as customers often modify the code so that a static copy of the original code fragment may be or look different than in their own system. By including the link to the code within their own system, no mapping to the performed changes needs to be manually made, with the end result being directly provided within and associated with their own code. Any suitable custom code migration suggestion system will benefit from the solution.

Turning to the illustrated embodiment, FIG. 1 is a block diagram illustrating an example system 100 for automatically generating an example database, including sample code, to provide custom code migration suggestion. Specifically, the illustrated system 100 includes or is communicably coupled with a platform system 150, a first development system 102, a second development system 170, and a network 148. Although shown separately, in some implementations, functionality of two or more systems or servers may be provided by a single system or server. In some implementations, the functionality of one illustrated system or server may be provided by multiple systems or servers. Additionally, while illustrated as a client-server system, alternative implementations of the solution may be used to allow for client to client transfers, server-to-server transfers, and client- and/or server-to-cloud or other system transfers, as appropriate.

As used in the present disclosure, the term "computer" is intended to encompass any suitable processing device. For example, first development system 102 may be any computer or processing device such as, a blade server, general-purpose personal computer (PC), Mac®, workstation, UNIX-based workstation, or any other suitable device. Moreover, although FIG. 1 illustrates first development system 102 as a single system, first development system 102 can be implemented using two or more systems, as well as computers other than servers, including a server pool. In other words, the present disclosure contemplates computers other than general-purpose computers, as well as computers without conventional operating systems. Further, illustrated first development system 102, second development system 170, and platform system 150 may each be adapted to execute any operating system, including Linux, UNIX, Windows, Mac OS®, Java™, Android™, or iOS. According to one implementation, the illustrated systems may also include or be communicably coupled with a communication server, an e-mail server, a web server, a caching server, a streaming data server, and/or other suitable servers or computers.

In general, first development system 102 may be any suitable computing server or system for running applications. In some implementations, the first development system 102 is a development system used by any one of system developer, industry developer, and other trusted developer. The first development system 102 is described herein in terms of communicating with platform system 150 and second development system 170, as well as other systems communicably coupled to network 148 or directly connected to the first development system 102. However, the first development system 102 may, in some implementations, be part of a larger system providing additional functionality. For example, first development system 102 may be part of an enterprise business application or application suite providing one or more of enterprise relationship management, data management systems, customer relationship management, and others. In one example, for testing purposes, first development system 102 may receive a list of changed core objects from the platform system 150, generate an example database, including sample code, that reacts to the changed core objects, receive a request for sample code that reacts to a specific changed core object from the second development system 170, and provide the requested sample code from the example database to the second development system 170. In some implementations, the first development system 102 may be associated with a particular URL for web-based applications. The particular URL can trigger execution of a plurality of components and systems.

As illustrated, first development system 102 includes an interface 104, a processor 106, a graphical user interface (GUI) 108, a development application 110, a change database analyzer 112, an object scanner 118, a version control system 120, and a memory 124. In general, the first development system 102 is a simplified representation of one or more systems and/or servers that provide the described functionality, and is not meant to be limiting, but rather an example of the systems possible.

The interface 104 is used by the first development system 102 for communicating with other systems in a distributed environment—including within the system 100—connected to the network 148 (e.g., second development system 170, platform system 150, and other systems communicably coupled to the network 148). The interface 104 may comprise logic encoded in software and/or hardware in a suitable combination and operable to communicate with the network 148. More specifically, the interface 104 may comprise software supporting one or more communication protocols associated with communications, such that the network 148 is operable to communicate physical signals with the interface 104 within and outside of the illustrated environment 100.

Network 148 facilitates wireless or wireline communications between the components of the environment 100 (e.g., between first development system 102 and second development system 170, between first development system 102 and platform system 150, and among others), as well as with any other local or remote computer, such as additional clients, servers, or other devices communicably coupled to network 148, including those not illustrated in FIG. 1. In the illustrated system, the network 148 is depicted as a single network, but may be comprised of more than one network without departing from the scope of this disclosure, so long as at least a portion of the network 148 may facilitate communications between senders and recipients. In some instances, one or more of the illustrated components may be included within network 148 as one or more cloud-based services or operations. For example, the first development system 102 may be cloud-based services. The network 148 may be all or a portion of an enterprise or secured network, while in another instance, at least a portion of the network 148 may represent a connection to the Internet. In some instances, a portion of the network 148 may be a virtual private network (VPN). Further, all or a portion of the network 148 can comprise either a wireline or wireless link. Example wireless links may include 802.11ac/ad,/af/a/b/g/n, 802.20, WiMax, LTE, and/or any other appropriate wireless link. In other words, the network 148 encompasses any internal or external network, networks, sub-network, or combination thereof operable to facilitate communications between various computing components inside and outside the illustrated system 100. The network 148 may communicate, for example, Internet Protocol (IP) packets, Frame Relay frames, Asynchronous Transfer Mode (ATM) cells, voice, video, data, and other suitable information between network addresses. The network 148 may also include one or more local area networks (LANs), radio access networks (RANs), metropolitan area networks (MANs), wide area networks (WANs), all or a portion of the Internet, and/or any other communication system or systems at one or more locations.

As illustrated in FIG. 1, the first development system 102 includes a processor 106. Although illustrated as a single processor 106 in FIG. 1, two or more processors may be used according to particular needs, desires, or particular implementations of the environment 100. Each processor 106 may be a central processing unit (CPU), an application-specific integrated circuit (ASIC), a field-programmable gate array (FPGA), or another suitable component. Generally, the processor 106 executes instructions and manipulates data to perform the operations of the first development system 102. Specifically, the processor 106 executes the algorithms and operations described in the illustrated figures, including the operations performing the functionality associated with the first development system 102 generally, as well as the various software modules (e.g., object scanner 118), including the functionality for sending communications to and receiving transmissions from second development system 170.

The development application 110 represents an application, set of applications, software, software modules, or combination of software and hardware used to perform operations related to developing high layer software components (e.g., system add-ons, partner add-ons, industry solutions) in the first development system 102. In the present solution, the development application 110 can perform operations, including developing high layer software components stored in development code 126 so that they can run in the new product (e.g., migrating high layer software components to the new product). In some implementations, the newly developed high layer software components are stored in development code 126.

The first development system 102 includes one or more software and/or firmware components that implement the change database analyzer 112. The change database analyzer 112 can provide functionality associated with communicating with notification module 160 in platform system 150 to receive a list of changed core objects and identifying code and metadata definitions from development code 126 that are dependent upon each changed core object (e.g., dependent objects in development code with reference to each changed core object in platform code). For example, an array of changed core objects [i] is received either from the notification module 160 or by reading the changed database 166. For each changed core object i, the change database analyzer 112 identifies a list of dependent objects j. As a result, an array of dependent objects [i,j] is created. The created array of dependent objects are stored in dependent object database 130. In some implementations, the locations of the identified dependent objects in the first development system 102 are stored in "where used" table 128. The dependent object database 130 now provides a list of objects in development code 126 that need to be changed as a reaction to a platform change. Developers of the first development system 102 can work on development code according to the list and make appropriate changes to objects listed in the list to migrate the development code to the new product.

The object scanner 118 represents an application, set of applications, software, software modules, or combination of software and hardware used to perform operations related to scanning code development process performed at the first development system 102 for changes to dependent objects listed in the dependent object database 130. If a change to a dependent object is detected, the object scanner 118 calls version control system 120 to obtain images of the dependent object before the change and/or after the change. In some implementations, the object scanner 118 may access the dependent object database 130 for additional information related to the dependent object. The object scanner 118 then stores all information associated with the changed dependent object (e.g., the referenced changed core object, the before and after images, etc.) in an example database 132.

The first development system 102 includes one or more software and/or firmware components that implement the version control system 120. The version control system 120 can provide functionality associated with tracking changes in the first development system. The version control system 120 includes a delta and context capture module 122 that captures changes in the first development system, stores a version (e.g., image) of changed dependent object in version history, and provides a version (e.g., image) of the dependent object before change when requested by the object scanner 118. In some cases, objects may be changed more than once in the development process. The single change or a list of relevant changes (e.g., a single most significant change, a sum of several changes, etc.) can be determined by the version control system 120. For example, a time period is specified for resolving the required changes due to platform changes and the latest change with the time period is considered as the most significant single change. In some implementations, this information can be annotated to the stored versions created the by the delta and context capture module 122.

Regardless of the particular implementation, "software" includes computer-readable instructions, firmware, wired and/or programmed hardware, or any combination thereof on a tangible medium (transitory or non-transitory, as appropriate) operable when executed to perform at least one of the processes and operations described herein. In fact, each software component may be fully or partially written or described in any appropriate computer language including C, C++, JavaScript, Java™, Visual Basic, assembler, Perl®, any suitable version of 4GL, as well as others.

As illustrated, first development system 102 includes a memory 124, or multiple memories 124. The memory 124 may include any memory or database module and may take the form of volatile or non-volatile memory including, without limitation, magnetic media, optical media, random access memory (RAM), read-only memory (ROM), removable media, or any other suitable local or remote memory component. The memory 124 may store various objects or data, including financial and/or business data, application information including URLs and settings, user information, behavior and access rules, administrative settings, password information, caches, backup data, repositories storing business and/or dynamic information, and any other appropriate information including any parameters, variables, algorithms, instructions, rules, constraints, or references thereto associated with the purposes of the object scanner 118 and/or the first development system 102. Additionally, the memory 124 may store any other appropriate data, such as VPN applications, firmware logs and policies, firewall policies, a security or access log, print or other reporting files, as well as others. For example, illustrated memory 124 includes development code 126, "where used" table 128, dependent object database 130, and example database 132.

The development code 126 stores high layer software components (e.g., code developed for system add-ons, partner add-ons, industry solutions). The "where used" table 128 stores locations of the identified dependent objects in the first development system 102. Developer of the first development system 102 can use the "where used" table 128 to identify where changes may need to be made. The dependent object database 130 stores the created array [i,j] of dependent objects. For each entry in the array [i,j], a reference to core object i (e.g., location of core object i in the platform system, and/or name of core object i) and a reference to dependent object j dependent upon core object i (e.g., location of dependent object j in the first development system, and/or name of dependent object j) are stored. The reference to dependent object j is a reference to the "before" status (e.g., the old code) before the change is performed.

The example database 132 stores sample code generated by the object scanner 118. The example database 132 includes an object examples 134 which includes an object reference 136, an object before change 138, and an object after change 140. The object reference 136 stores references to changed core objects in the platform system. The object before change 138 stores references to dependent objects before change in the first development system. In some implementations, the object before change 138 also stores images of dependent objects before change in the first development system. The object after change 140 stores references to dependent objects after change in the first development system. In some implementations, the object after change 140 also stores images of dependent objects after change in the first development system. In some implementations, additional information may be store in the example database 132. For example, ranking of sample code may be included in the example database 132 to allow the example database 132 to provide a list of examples, with the best fit provided first. In another example, sample code in the example database 132 is annotated with code type (e.g., report, function, class, data element, view, structure, interface definition, UI, etc.) to allow the example database 132 to provide examples in a specific type. In some implementations, the example database 132 may be accessed by other development system different than the first development system (e.g., the second development system 170). In some implementations, the example database 132 may be sent out when requested by other development system (e.g., the second development system 170). In one example, the object before change 138 and the object after change 140 refer to reference to the object before or after the change, respectively, and not to the object itself. Each object is associated with a unique identifier in the system, with the unique identifier reference being what is stored. In some systems, the unique identifier may include a class and a method name (e.g., in Java systems). References are used as the actual object may look differently in different systems (e.g., the platform system vs. a customer system). As long as the identifier does not change, the references will point to the correct object. If the identifier changes, then the object before the change is a different object after the change, although both objects can still be referenced by their unique (and here, different) identifiers.

Second development system 170 may be any computing device operable to connect to or communicate with first development system 102, platform system 150, other development systems (not illustrated), or other components via network 148, as well as with the network 148 itself, using a wireline or wireless connection, and can include a desktop computer, a mobile device, a tablet, a server, or any other suitable computer device. In some implementations, the second development system is a development system used by the customer developer. In some implementations, the second development system can be any system after at least some changes have been captured in an example database. In general, the second development system 170 comprises an electronic computer device operable to receive, transmit, process, and store any appropriate data associated with the system 100 of FIG. 1. In some instances, second development system 170 can be a particular thing within a group of the internet of things, such as a connected appliance or tool.

As illustrated, the second development system 170 includes an interface 172, a processor 174, a GUI 176, a code analyzer 178, a development application 184, and a memory 186. Interface 172 and processor 174 may be similar to or different than the interface 104 and processor 106 described with regard to first development system 102. In general, processor 174 executes instructions and manipulates data to perform the operations of the second development system 170. Specifically, the processor 174 can execute some or all of the algorithms and operations described in the illustrated figures, including the operations performing the functionality associated with the development application 184 and the other components of second development system 170. Similarly, interface 172 provides the second development system 170 with the ability to communicate with other systems in a distributed environment—including within the system 100—connected to the network 148.

The second development system 170 includes one or more software and/or firmware components that implement the code analyzer 178. In some implementations, the code analyzer 178 is a "where used" analysis tool. The code analyzer 178 can provide functionality associated with communicating with notification module 160 in platform system 150 to receive a list of changed core objects and identifying code and metadata definitions from custom code that are dependent upon each changed core object (e.g., dependent objects in custom code with reference to each changed core object in platform code). The identified dependent objects with reference to each changed core object are stored in dependent object database 190. The locations of the identified dependent objects in the custom code are stored in "where used" table 188. The code analyzer 178 includes a task list generator 180 that generates a task list of objects in custom code that need to be changed based on the reference to each changed core object (i.e., what has changed in the platform). The generated task list is stored in task list 192. The code analyzer 178 also includes an example analyzer 182 that matches the task list to one or more examples from other systems (e.g., examples from the example database 132) and stores links to the one or more examples in links to example database 194. Customer developer of the second development system 170 can work on custom code according to the task list and make appropriate changes to objects listed in the task list to migrate the custom code to the new product based on the suggestions (e.g., examples) accessed through links in links to example database 194.

The development application 184 represents an application, set of applications, software, software modules, or combination of software and hardware used to perform operations related to developing custom code in the second development system 170. In the present solution, the development application 184 can perform operations including developing custom code so that the custom code can run in the new product (e.g., migrating custom code to the new product).

Memory 186 may be similar to or different from memory 124 of the first development system 102. In general, memory 186 may store various objects or data, including any parameters, variables, algorithms, instructions, rules, constraints, or references thereto associated with the purposes of the development application 184 and/or second development system 170. Additionally, memory 186 may store any other appropriate data, such as VPN applications, firmware logs and policies, firewall policies, a security or access log, print or other reporting files, as well as others. For example, illustrated memory 186 includes "where used" table 188, dependent object database 190, and task list 192.

The "where used" table 188 stores locations of the identified dependent objects in the second development system 170. Developer of the second development system 170 can use the "where used" table 188 to identify where changes may need to be made. The dependent object database 190 stores references to changed core objects in the platform system and references to dependent objects dependent upon the changed core objects. The references to dependent objects are references to the "before" status (e.g., the old code) before changes are performed. The task list 192 stores a task list of objects in custom code that need to be changed. The links to example database 194 stores links to examples for corresponding objects that need to be changed in the task list 192.

The illustrated second development system 170 is intended to encompass any computing device such as a desktop computer, laptop/notebook computer, mobile device, smartphone, personal data assistant (PDA), tablet computing device, one or more processors within these devices, or any other suitable processing device. For example, the second development system 170 may comprise a computer that includes an input device, such as a keypad, touch screen, or other device that can accept user information, and an output device that conveys information associated with the operation of the development application 184 or the second development system 170 itself, including digital data, visual information, or a GUI 176, as shown with respect to the second development system 170. Further, while illustrated as a client system, second development system 170 may be exchanged with another suitable source for file transfers in other implementations, and is not meant to be limiting.

Platform system 150 may be any computing device operable to connect to or communicate with first development system 102, second development system 170, other development systems (not illustrated), or other components via network 148, as well as with the network 148 itself, using a wireline or wireless connection, and can include a desktop computer, a mobile device, a tablet, a server, or any other suitable computer device. In general, platform system 150 comprises an electronic computer device operable to receive, transmit, process, and store any appropriate data associated with the system 100 of FIG. 1. In some instances, platform system 150 can be a particular thing within a group of the internet of things, such as a connected appliance or tool.

As illustrated, platform system 150 includes an interface 152, a processor 154, a core development platform 156, and a memory 162. Interface 152 and processor 154 may be similar to or different than the interface 104 and processor 106 described with regard to first development system 102. In general, processor 154 executes instructions and manipulates data to perform the operations of the platform system 150. Specifically, the processor 154 can execute some or all of the algorithms and operations described in the illustrated figures, including the operations performing the functionality associated with the core development platform 156 and the other components of platform system 150. Similarly, interface 152 provides the platform system 150 with the ability to communicate with other systems in a distributed environment—including within the system 100—connected to the network 148.

The core development platform 156 represents an application, set of applications, software, software modules, or combination of software and hardware used to perform operations related to developing platform code in the platform system 150. In the present solution, the core development platform 156 can perform operations including developing new platform code (e.g., developing a new product), monitoring changed core objects during the development process, and notifying other development systems (e.g., first development system 102 and second development system 170) about the changed core objects. As illustrated, the core development platform 156 includes a change monitor module 158 and a notification module 160.

The change monitor module 158 monitors the new platform code development process for any core object that has been changed during the process and stores the changed core objects in the change database 166. In some implementations, change to an object is not straightforward. For example, a tables is de-normalized and restructured in a change. The nodification module 160 can communicate with components of other development systems (e.g., change database analyzer 112 and code analyzer 178) and provides a list of changed core objects from the change database 166 to at least one development system. For example, code analyzer 178 of second development system 170 receives the list of changed core objects from the nodification module 160 and can generate a task list of objects in custom code that need to be changed as a reaction to the changed core objects.

Memory 162 may be similar to or different from memory 124 of the first development system 102. In general, memory 162 may store various objects or data, including any parameters, variables, algorithms, instructions, rules, constraints, or references thereto associated with the purposes of core development platform 156 and/or platform system 150. Additionally, memory 162 may store any other appropriate data, such as VPN applications, firmware logs and policies, firewall policies, a security or access log, print or other reporting files, as well as others. For example, illustrated memory 162 includes platform code 164 and change database 166.

The platform code 164 stores the newly developed platform code by the core development platform 156. In some implementations, a new product is released and distributed to development systems from the platform code 164. In some implementations, the platform code 164 also stores an old platform code (e.g., old product) in addition to the new platform code. The change database 166 includes modified object 168, which stores core objects in the old platform code that have been changed during the new platform code development process. In some implementations, a guide of what to do to a changed object is also stored in the modified object 168.

While portions of the software elements illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Figure 2:
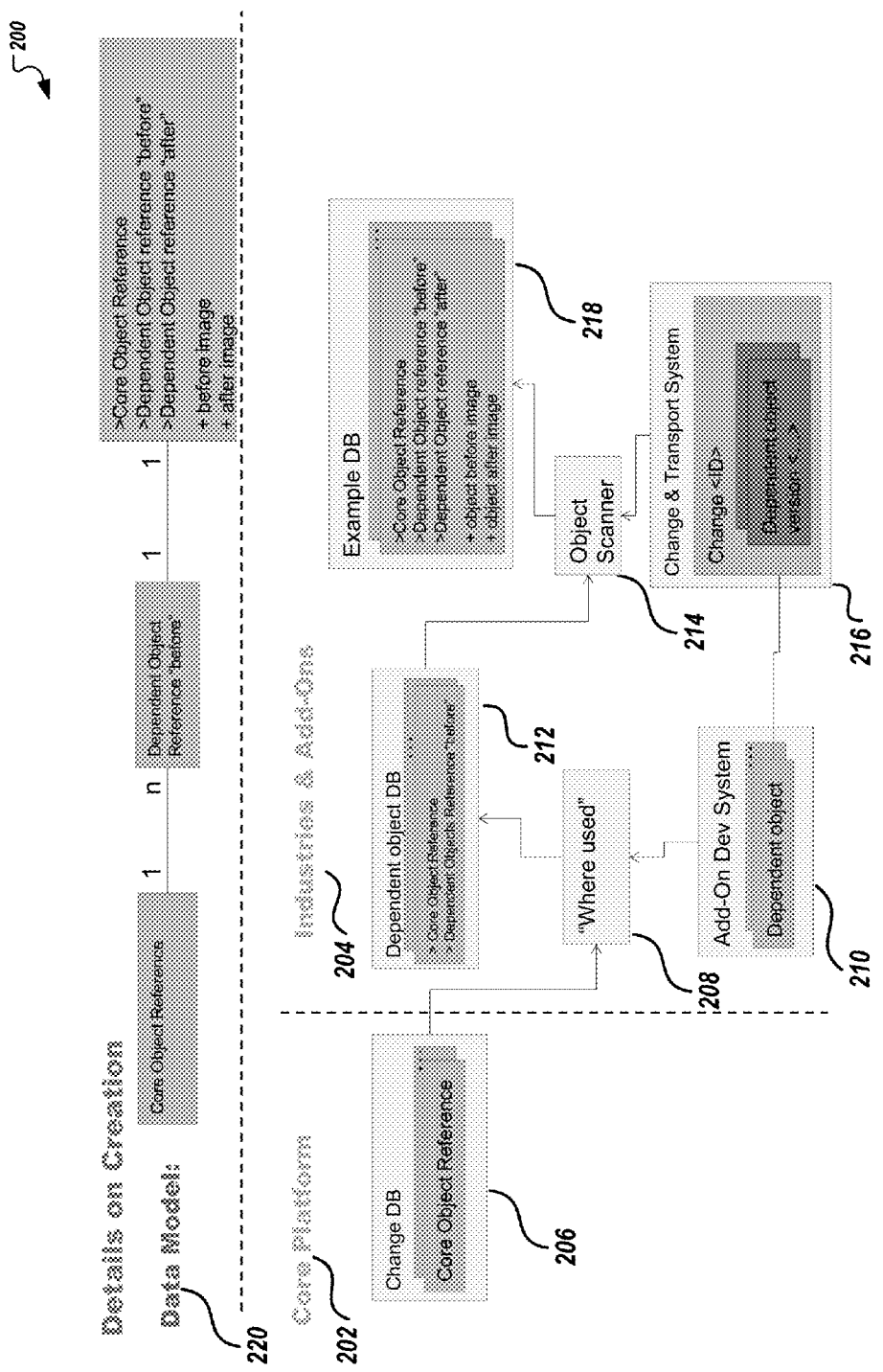
FIG. 2 is a diagram of example actions performed to capture changes performed in a first development system.

FIG. 2 is a diagram of example actions 200 performed to capture changes performed in a first development system (e.g., Industries and Add-Ons 204). In some implementations, the actions 200 may include additional and/or different components not shown in the diagram. Components may also be omitted from the actions 200, and additional messages may be added to the actions 200. The components illustrated in FIG. 2 may be similar to or different from those described in FIG. 1.

To create a list of objects, in the first development system, depending on core objects that were changed (e.g., core objects stored in change database 206) in core platform 202, a "where used" analysis tool 208 is used in the first development system. The "where used" analysis tool 208 searches example Add-On development system 210 for objects that are dependent upon any core objects stored in the change database 206, and stores a reference to a particular core object (e.g., location of the core object in the platform system, and/or name of the core object) and a reference to a dependent object dependent upon the particular core object in a dependent object database 212 (e.g., location of the dependent object in the first development system, and/or name of the dependent object). The reference of the dependent object is a reference to the "before" status (e.g., the old code) before the change is performed.

A change and transport control system 216 (e.g., version control system 120) keeps track of changes in the first development system performed by developers of the first development system (e.g., system developers, industry developers, and other trusted developers). Changes made to objects in the dependent object database 212 (i.e. changes to objects dependent upon an entry in the change database 206) are identified. An object scanner 214 scans for changed dependent objects, and for each changed dependent object the object scanner 214 acquires a reference to the particular changed dependent object (e.g., a reference to the "after" status) from the change and transport control system 216 and corresponding references to core object and dependent object "before" from the dependent object database 212. The object scanner 214 then extracts coding fragments of the particular dependent object, both before and after the change is performed, and stores the coding fragments in an example database 218 as dependent object "before" and "after" images. The references (e.g., core object reference, dependent object reference "before", and dependent object reference "after") are also stored in the example database 218.

The example database 218 may be an indexed database of code fragments. For each set of "before" and "after" images of dependent object, there exists references to the dependent object, before and after the change, in the first development system as well as a reference to the core object being the origin of the development activity. In some implementations, ranking of the coding fragments is also included in the example database 218 to allow the example database 218 to provide a list of examples, with the best fit provided first, to the customer developer. As illustrated in data model 220, there may be a list of dependent objects j that are dependent upon a single core object [i]. For each [i,j], there is an entry in the example database 218.

Figure 3:
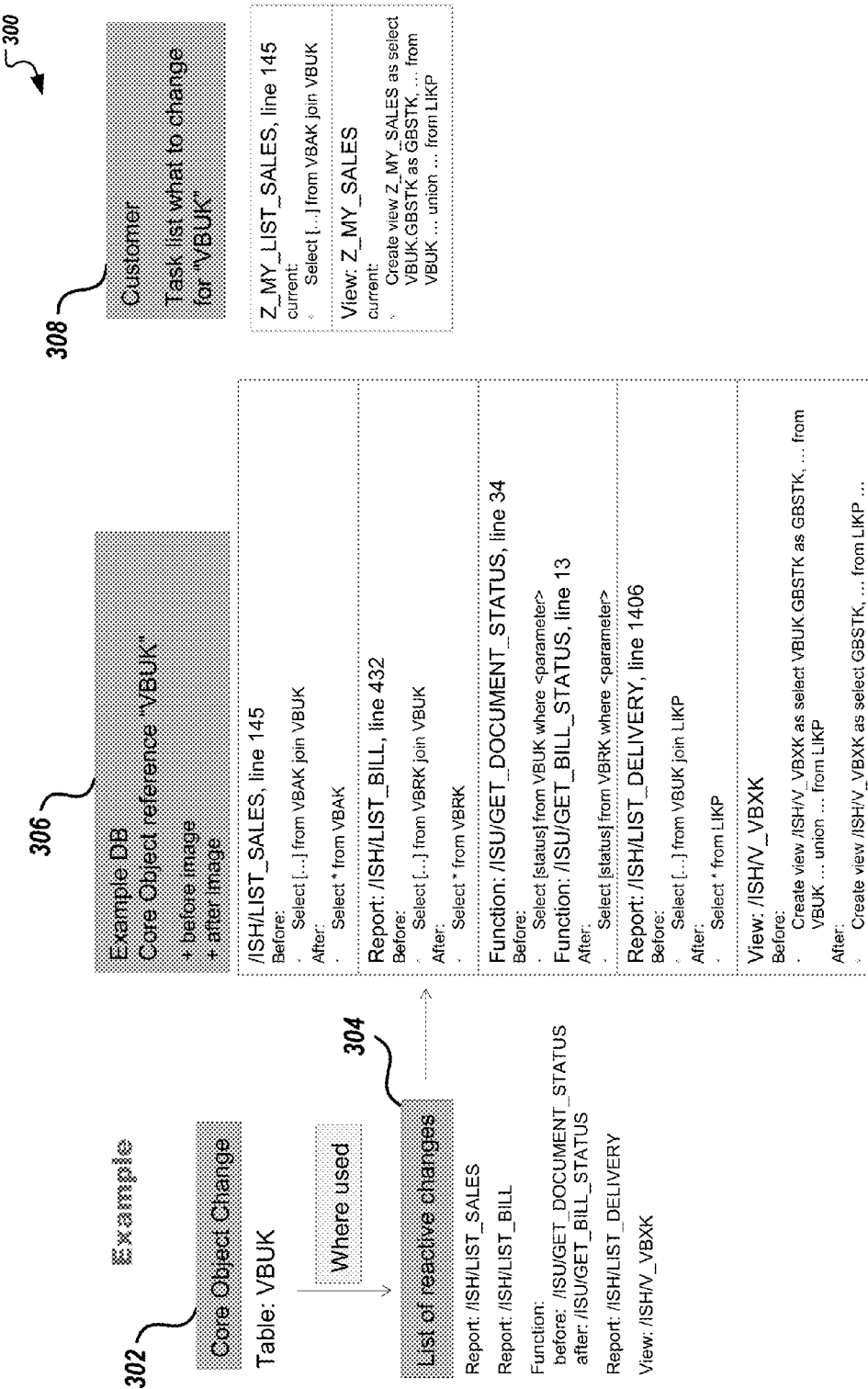
FIG. 3 is an example view of captured changes performed in the first development system.

FIG. 3 is an example view 300 of captured changes performed in a first development system. In this example, a table in a platform code has been redesigned from an original product to a target product, and the change to the table is recorded in the change database (e.g., recorded as core object change 302). In this example, there are four tables in the original product, namely:

VBUK: Sales Document: Header Status and Administrative Data;
VBAK: Sales Document: Header Data;
VBRK: Billing Document: Header Data; and
LIKP: SD Document: Delivery Header Data.

The table VBUK contains data related to sales documents, billing documents, and delivery document.

In the target product, the table VBUK is deleted and the fields of VBUK are added to the tables VBAK, VBRK, and LIKP. The data stored in VBUK is distributed to the other three tables based on the data type (e.g., sales document, billing document, and delivery document). For the other three tables, a select from VBAK and VBUK is replaced by a select from VBAK alone, a select from VBRK and VBUK is replaced by a select from VBRK alone, and a select from LIKP and VBUK is replaced by a select from LIKP along.

In the example view 300, code of ISH in the first development system is analyzed. The list of reactive changes 304 in the code of ISH are:
   Report: /ISH/LIST_SALES is changed;
   Report: /ISH/LIST_BILL is changed;
   Function: /ISU/GET_DOCUMENT_STATUS is deleted, a new function is created: /ISU/GET_BILL_STATUS;
   Report: /ISH/LIST_DELIVERY is changed; and
   View: /ISH/V_VBXK is changed.

These dependent objects are found by a "where used" analysis tool (e.g., the change database analyzer 112) in the first development system and the change database (e.g., core object change 302) in the platform system. The dependent objects are stored in a dependent object database (e.g., 130 in FIG. 1) in the first development system. The object scanner (e.g., 118 in FIG. 1) then finds the "before" and "after" image of the dependent objects and stores them in an example database 306 (e.g., 132 in FIG. 1). In the example view 300, only one line of code is stored for each "before" and "after" image in the example database 306. In some implementations, the example database may contain a complete report or at least 30 lines of code for each "before" and "after" image.

In a second development system where data in the example database are consumed, objects in a customer code dependent upon the changed table are found by a "where used" analysis tool (e.g., the code analyzer 178) in the second development system and the change database (e.g., core object change 302) in the platform system. A task list 308 containing the objects to be changed in the customer code as a reaction to the platform code change is generated for the customer developer. In addition to the task list 308, in this solution the customer developer is provided with additional sample coding in the example database 306. The sample coding provides suggestions of how others deal with the same platform code change and may guide the customer developer to migrate the customer code to the target product more easily.

Figure 4:
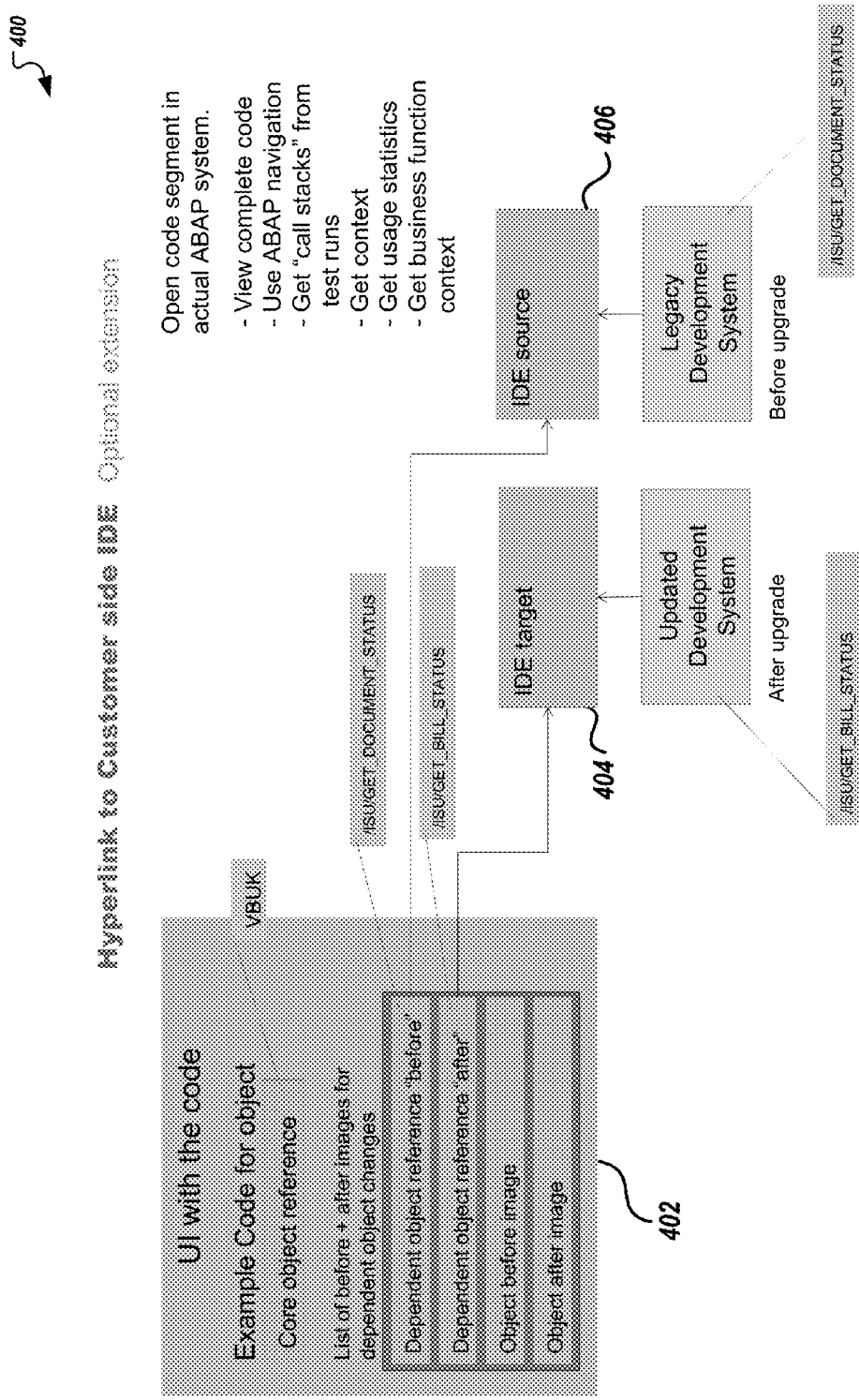
FIG. 4 is an example view of an example user interface (UI) for presenting a before and after view associated with a change in the second development system.

FIG. 4 is an example view 400 of an example UI for presenting a before and after view associated with a change in the second development system. A developer at the second development system initially has the following setup: a development system on the start release. As described in FIG. 3, the developer is provided with the task list 308. In this solution, the developer is also provided with coding samples, so that the developer can view how did others do as a reaction to the change (e.g., deleting table VBUK), and plan what to do for custom code more easily. The developer can use the "core object reference" as a hyperlink to get examples from the example database. The "core object reference" is searched in the example database and the result sets are displayed.

The developer then calls a function or UI "get task list, what to change" (i.e., the example analyzer 182). As a result, the change database is read by the second development system and a list of changed core objects is provided. The "get task list, what to change" scans code in the development system and lists development artifacts using the changed core objects. The list of development artifacts is provided to the UI. The developer now can select one of the development artifacts to work on a solution. The selection specifies the core object reference in the change database, for which examples shall be looked up. The developer calls a function or UI "get examples" for the selected development artifact. As a result, the example database scans for entries related to the changed core object selected by the developer and provides a list of "before" and "after" images, context information, ranking information, and potentially text search. Each result set of "before" and "after" images includes dependent object reference "before", dependent object reference "after", dependent object "before" image, and dependent object "after" image. The example UI 402 provide one example related to core object "VBUK". The sample code can be shown together on a split screen. For example, old sample code is shown in left side of the screen and new sample code is shown in tight side of the screen. Changes made in the sample code may be highlighted. The developer can browse the list and view the different examples (e.g., a change in core object coding, a change in dependent object coding, a change in a view definition, a change in an interface, etc.).

When the development system is upgraded to the target version, the development process can start. However, the production is still on the start version. The dependent object reference "after" can now be used to view the coding in the local upgraded system. The dependent object reference "before" can be used to view the coding in the local start release system (e.g., on the actual state the customer has, potentially including customer modification, etc.). Both systems have an IDE (e.g., IDE target 404 and IDE source 406) and the developer can browse code and navigate through object dependencies in the IDE.

The developer can determine which core object was changed, whether the changed core object impacts custom code of the developer, and how others had reacted to the same change. The developer can navigate to the IDE for the dev (e.g., target release) or prod (e.g., source release) system, and view the referenced objects in the IDE. The IDE is opened with the code from the dev or prod system. The developer can also view the context in a large font, view the complete code, navigate within code (e.g., navigate from code to data dictionary definitions), navigate to functions called, view customizing settings, and identify business function, business process, UI called, or wherever the code is used.

In the production system, the developer can initiate a system trace of the respective business function, process, and/or UI identified above may be initiated. The developer can also view the call stack (e.g., where had the code been called). The developer can determine which core object was changed, whether the changed core object impacts custom code of the developer, how others had reacted to the same change, where in the old and new system the developer actually works with the custom code, where the custom code is used in the business processes and/or UIs, and how the custom code is configured in the actual production system and the call stacks of the code fragment.

Figure 5:
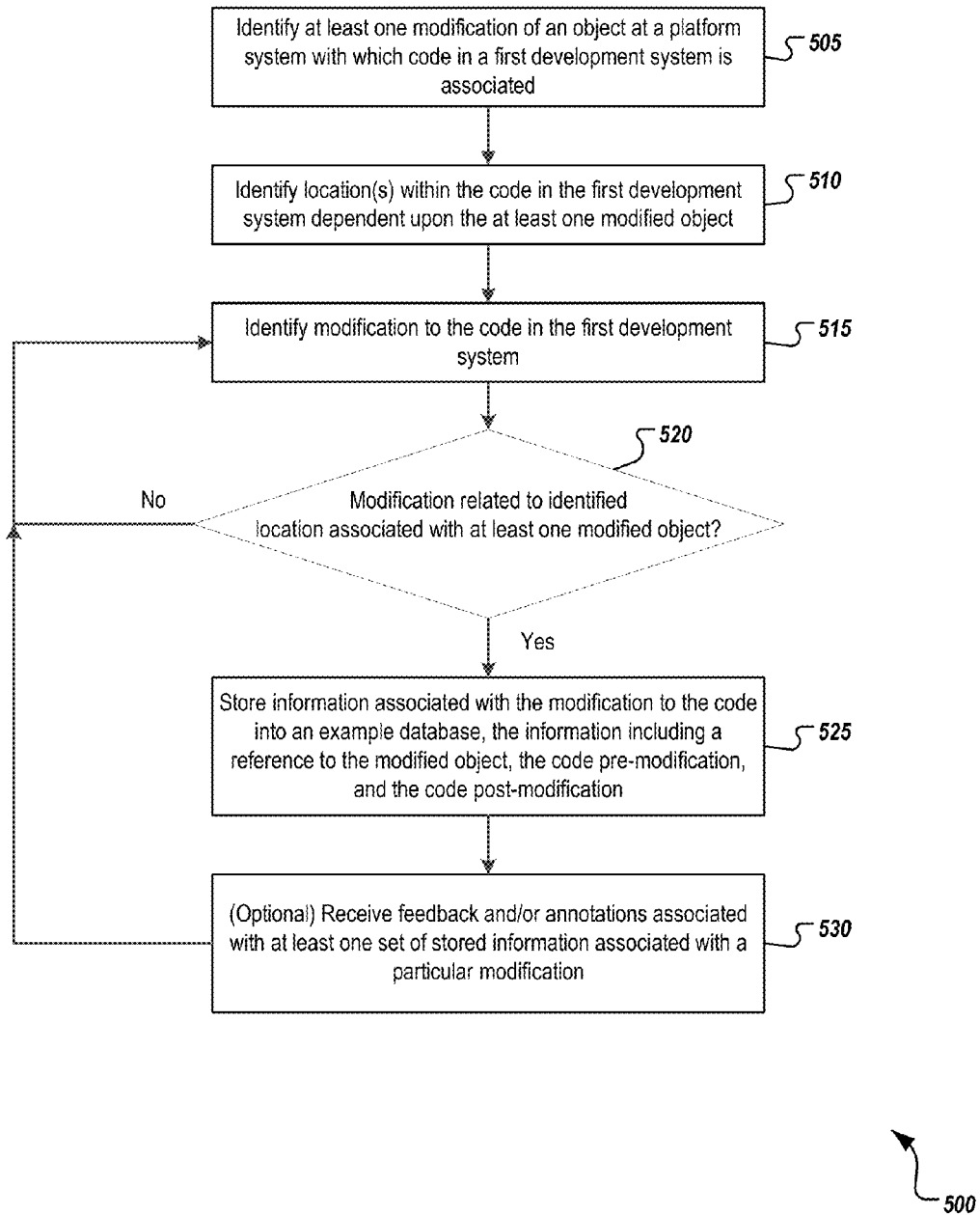
FIG. 5 is a flowchart of an example method for automatically generating an example database, including sample code, to provide custom code migration suggestion.

FIG. 5 is a flowchart of an example method for automatically generating an example database, including sample code, to provide custom code migration suggestion. It will be understood that method 500 and related methods may be performed, for example, by any suitable system, environment, software, and hardware, or a combination of systems, environments, software, and hardware, as appropriate. For example, one or more of a client, a server, or other suitable computing device can be used to execute method 500 and related methods and obtain any data from the memory of a client, the server, or the other computing device. In some implementations, the method 500 and related methods are executed by one or more components of the system 100 described above with respect to FIG. 1. For example, the method 500 and related methods can be executed by the first development system 102 of FIG. 1.

At 505, at least one modification of an object at a platform system is identified. The platform system includes platform code and the platform code is associated with code in a first development system. The object may be any one of a class, a report, a function, a table, a view, and an interface. The code includes system add-ons, partner add-ons, and industry solutions that built on the platform code. In some cases, the identification is based on a change database located at the platform system. In some cases, the first development system is separated from the platform system. In some cases, a set of modified objects are stored in a change database at the platform system. The change database is populated in response to changes to the platform code for the platform system. In some cases, the first development system may be associated with a customer and/or an internal development team/developer.

At 510, location(s) within the code in the first development system dependent upon the at least one modified object is identified. In some cases, the identification is based on "where used" information which identifies where particular calls are made. In some cases, at least one development artifact in the code of the first development system dependent upon the at least one of the modified objects is determined. In some cases, the determination includes accessing a list of location(s) within the code of the first development system where the modified objects of the set of modified objects are used, and associating each location in the list of location(s) to a particular development artifact in the code of the first development system. In other cases, the determination includes generating a task list associated with each of the at least one determined development artifacts. The task list identifies required changes in the code of the first development system based on the set of modified objects. In some cases, the at least one development artifact includes at least one of a class, a report, a function, a table, a view, and an interface. The determined at least one development artifact is located at the identified location(s) within the code in the first development system.

At 515, modification to the code in the first development system is identified. In some cases, the modification is detected via a version control system. In some cases, changes to the code of the first development system is monitored for changes to development artifacts dependent upon the at least one modified object. In some cases, the monitoring includes identifying, by a version control system of the first development system, changes to the code of the first development system, and comparing the identified changes to the code of the first development system with a list of development artifacts dependent upon at least one of the modified objects.

At 520, a determination is made as to whether the identified modification is related to identified location(s) associated with the at least one modified object. If the determination is confirmed, method 500 continues to 525. If, however, the determination is not confirmed, method 500 continues to 515. In some cases, the determination is made as to whether a particular development artifact dependent upon the at least one modified object is changed. In some cases, the determination is made by comparing the identified modification to the code and its components to a dependent object database that stores information on where the objects are used. In some cases, changes can be made to an object differently in two different instances.

At 525, information associated with the modification to the code is automatically stored into an example database. The stored information includes a reference to the modified object, the code pre-modification, and the code post-modification. In some cases, the stored information also includes an image of the pre-modification code and an image of the post-modification code. In some cases, information associated with the change to the particular development artifact dependent upon the at least one modified object is automatically stored into the example database. The stored information includes a reference to the at least one modified object, a code fragment associated with the particular development artifact prior to the determined change, and a code fragment associated with the particular development artifact after the determined change. In some cases, a reference to the particular development artifact prior to the determined change and a reference to the particular development artifact after the determined change are also stored in the example database. The example database stores examples of changes to the code associated with the set of modified objects.

In some implementations, further operations for generating an example database can be optionally performed. For example, 525 may proceed to 530. At 530, feedback and/or annotations associated with at least one set of stored information associated with a particular modification are received. In some cases, the feedback and/or annotations are received from the developer who made the particular modification. In some cases, the feedback and/or annotations are received from other developers who uses the particular modification as a sample suggestion. In some cases, internal developer (e.g., system developer, industry developer, and other trusted developer) can give internal feedback about usefulness of the particular modification, context information (e.g., reference to external documentations), and/or additional hints to the particular modification. In some cases, the customer developer can give a rating of usefulness to the particular modification after using it as a sample suggestion. In some cases, feedback and/or annotations may be based on number of users by other users. In some cases, feedback and/or annotations associated with at least one set of stored information associated with a particular modification are also stored in the example database. From 530, method 500 continues to 515.

Figure 6:
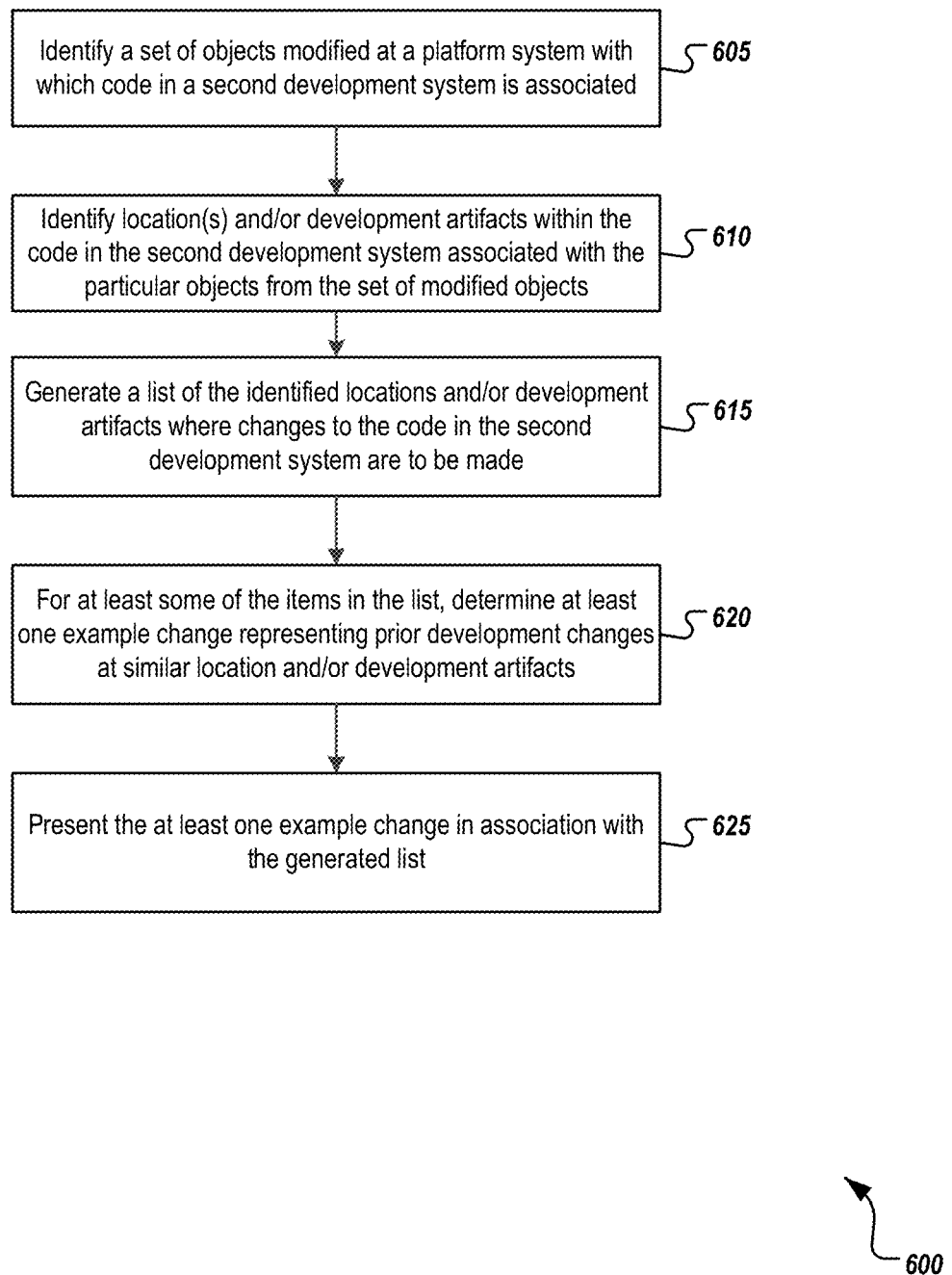
FIG. 6 is a flowchart of an example method for utilizing the example database, including sample code, to perform custom code migration.

FIG. 6 is a flowchart of an example method for utilizing the example database, including sample code, to perform custom code migration. It will be understood that method 600 and related methods may be performed, for example, by any suitable system, environment, software, and hardware, or a combination of systems, environments, software, and hardware, as appropriate. For example, one or more of a client, a server, or other computing device can be used to execute method 600 and related methods and obtain any data from the memory of a client, the server, or the other computing device. In some implementations, the method 600 and related methods are executed by one or more components of the system 100 described above with respect to FIG. 1. For example, the method 600 and related methods can be executed by the second development system 170 of FIG. 1.

At 605, a set of objects modified at a platform system with which code in a second development system is associated is identified. Objects of the set of modified objects include at least one of a class, a report, a function, a table, a view, and an interface. In some cases, the code in the second development system is custom code developed on a platform code by the customer developer.

At 610, location(s) and/or development artifacts within the code in the second development system associated with the particular objects from the set of modified objects are identified. In some cases, development artifacts are identified using the changed database. In some cases, development artifacts are identified based on a where to used list. In some cases, development artifacts include at least one of a class, a report, a function, a table, a view, and an interface.

At 615, a list of the identified locations and/or development artifacts where changes to the code in the second development system are to be made is generated. In some cases, at least one development artifact in the code of the second development system dependent upon at least one of the modified objects is determined.

At 620, for at least some of the items in the list, at least one example change representing prior development changes at similar location and/or development artifacts is determined. In some cases, each of the at least one example change is associated with the list. In some cases, the at least one example change is performed in a development system different than the second development system.

At 625, the at least one example change in association with the generated list is presented to guide a developer associated with the second development system migrating the code as a reaction to a platform change. In some cases, the list and at least a portion of the at least one example change is presented to the developer. In some cases, the at least one example change can be included in the list. In some cases, the at least one example change can be presented when a particular object, a particular artifact, or a particular location is selected or indicated by the developer. In some cases, the presentation includes two or more example changes. In some cases, the two or more example changes are ranked based on at least one of relevance, score, and rating. In some cases, the presentation includes object reference "before", object reference "after", object image "before", and object image "after".

Alternative methods of automatically generating an example database to provide custom code migration suggestion may be used in other implementations. Those described herein are examples and are not meant to be limiting.

The preceding figures and accompanying descriptions illustrate example systems, processes, and computer-implementable techniques. While the illustrated systems and processes contemplate using, implementing, or executing any suitable technique for performing these and other tasks, it will be understood that these systems and processes are for illustration purposes only and that the described or similar techniques may be performed at any appropriate time, including concurrently, individually, or in combination, or performed by alternative components or systems. In addition, many of the operations in these processes may take place simultaneously, concurrently, and/or in different orders than as shown. Moreover, the illustrated systems may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A method for automatically generating code migration documentation including sample code related to one or more changes to platform code, the method comprising:

identifying a set of modified objects associated with platform code for a platform software system, the platform code associated with code in at least a first development system;

automatically determining, in response to identifying the set of modified objects, at least one development artifact in the code of the first development system dependent upon at least one of the modified objects;

monitoring changes to the code of the first development system for changes to development artifacts dependent upon the at least one modified object; and in response to determining a change to a particular development artifact dependent upon the at least one modified object, automatically storing information associated with the change to the particular development artifact dependent upon the at least one modified object into an example database, the example database storing examples of changes to code associated with the set of modified objects.

2. The method of claim 1, wherein objects of the set of modified objects include at least one of a class, a report, a function, a table, a view, and an interface.

3. The method of claim 1, wherein the set of modified objects are stored in a change database at the platform software system, the change database populated in response to changes to the platform code for the platform software system.

4. The method of claim 1, wherein determining the at least one development artifact in the code of the first development system dependent upon the at least one of the modified objects comprises:

accessing a list of locations within the code of the first development system where the modified objects of the set of modified objects are used; and associating each location in the list of locations to a particular development artifact in the code of the first development system.

5. The method of claim 1, wherein determining the at least one development artifact in the code of the first development system dependent upon the at least one of the modified objects comprises generating a task list associated with each of the at least one determined development artifact, wherein the task list identifies required changes in the code of the first development system based on the set of modified objects.

6. The method of claim 1, wherein monitoring changes to the code of the first development system for changes to development artifacts dependent upon at least one modified object comprises:

identifying, by a version control system, changes to the code of the first development system; and comparing the identified changes to the code of the first development system with a list of development artifacts dependent upon at least one of the modified objects.

7. The method of claim 1, wherein the automatically stored information associated with the change to the particular development artifact dependent upon the at least one modified object includes a reference to the at least one modified object associated with the platform code, a code fragment associated with the particular dependent development artifact prior to the determined change, and a code fragment associated with the particular dependent development artifact after the determined change.

8. The method of claim 7, the automatically stored information further including a reference to the particular dependent development artifact prior to the determined change and a reference to the particular dependent development artifact after the determined change.

9. The method of claim 7, further comprising:
   determining at least one development artifact in code of a second development system dependent upon at least one of the modified objects, the platform code associated with the code in the second development system, wherein determining comprises generating a task list associated with each of the at least one determined development artifact in the code of the second development system, wherein the task list identifies required changes in the code of the second first development system based on the set of modified objects;
   for at least one of the at least one determined development artifact in the code of the second development system, identifying at least one example of changes to code from the example database corresponding to the at least one modified object upon which the particular development artifact in the code of the second development system; and
   associating each of the at least one identified example of changes with the task list.

10. The method of claim 9, further comprising presenting the task list and at least a portion of the at least one identified example of changes to a developer associated with the second development system.

11. A non-transitory computer storage medium encoded with a computer program, the program comprising instructions that when executed by one or more computers cause the one or more computers to perform operations comprising:
   identifying a set of modified objects associated with platform code for a platform software system, the platform code associated with code in at least a first development system;
   automatically determining, in response to identifying the set of modified objects, at least one development artifact in the code of the first development system dependent upon at least one of the modified objects;
   monitoring changes to the code of the first development system for changes to development artifacts dependent upon the at least one modified object; and
   in response to determining a change to a particular development artifact dependent upon the at least one modified object, automatically storing information associated with the change to the particular development artifact dependent upon the at least one modified object into an example database, the example database storing examples of changes to code associated with the set of modified objects.

12. The medium of claim 11, wherein objects of the set of modified objects include at least one of a class, a report, a function, a table, a view, and an interface.

13. The medium of claim 11, wherein the set of modified objects are stored in a change database at the platform software system, the change database populated in response to changes to the platform code for the platform software system.

14. The medium of claim 11, wherein determining the at least one development artifact in the code of the first development system dependent upon the at least one of the modified objects comprises:
   accessing a list of locations within the code of the first development system where the modified objects of the set of modified objects are used; and
   associating each location in the list of locations to a particular development artifact in the code of the first development system.

15. The medium of claim 11, wherein determining the at least one development artifact in the code of the first development system dependent upon the at least one of the modified objects comprises generating a task list associated with each of the at least one determined development artifact, wherein the task list identifies required changes in the code of the first development system based on the set of modified objects.

16. The medium of claim 11, wherein monitoring changes to the code of the first development system for changes to development artifacts dependent upon at least one modified object comprises:
   identifying, by a version control system, changes to the code of the first development system; and
   comparing the identified changes to the code of the first development system with a list of development artifacts dependent upon at least one of the modified objects.

17. The medium of claim 11, wherein the automatically stored information associated with the change to the particular development artifact dependent upon the at least one modified object includes a reference to the at least one modified object associated with the platform code, a code fragment associated with the particular dependent development artifact prior to the determined change, and a code fragment associated with the particular dependent development artifact after the determined change.

18. The medium of claim 17, the operations further comprising:
   determining at least one development artifact in code of a second development system dependent upon at least one of the modified objects, the platform code associated with the code in the second development system, wherein determining comprises generating a task list associated with each of the at least one determined development artifact in the code of the second development system, wherein the task list identifies required changes in the code of the second first development system based on the set of modified objects;
   for at least one of the at least one determined development artifact in the code of the second development system, identifying at least one example of changes to code from the example database corresponding to the at least one modified object upon which the particular development artifact in the code of the second development system; and
   associating each of the at least one identified example of changes with the task list.

19. The medium of claim 18, the operations further comprising presenting the task list and at least a portion of the at least one identified example of changes to a developer associated with the second development system.

20. A system comprising:
   one or more processors; and
   a non-transitory computer-readable medium storing instructions executable by the one or more processors to perform operations comprising:
      identifying a set of modified objects associated with platform code for a platform software system, the platform code associated with code in at least a first development system;
      automatically determining, in response to identifying the set of modified objects, at least one development artifact in the code of the first development system dependent upon at least one of the modified objects;
      monitoring changes to the code of the first development system for changes to development artifacts dependent upon the at least one modified object; and in response to determining a change to a particular development artifact dependent upon the at least one modified object, automatically storing information associated with the change to the particular development artifact dependent upon the at least one modified object into an example database, the example database storing examples of changes to code associated with the set of modified objects.

* * * * *